US012565261B2

(12) United States Patent
Yoo et al.

(10) Patent No.: US 12,565,261 B2
(45) Date of Patent: Mar. 3, 2026

(54) MOTOR DRIVEN POWER STEERING SYSTEM OF REDUNDANCY STRUCTURE

(71) Applicant: HYUNDAI MOBIS CO., LTD., Seoul (KR)

(72) Inventors: Ho Jun Yoo, Yongin-si (KR); Yun Yeong Park, Yongin-si (KR); Dong Hyun Kim, Yongin-si (KR); Sung Bem Yoo, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 660 days.

(21) Appl. No.: 18/071,721

(22) Filed: Nov. 30, 2022

(65) Prior Publication Data

US 2024/0059349 A1     Feb. 22, 2024

(30) Foreign Application Priority Data

Aug. 18, 2022     (KR) ........................ 10-2022-0103311

(51) Int. Cl.
B62D 5/04          (2006.01)

(52) U.S. Cl.
CPC ........... B62D 5/0484 (2013.01); B62D 5/046 (2013.01); B62D 5/0487 (2013.01); B62D 5/049 (2013.01)

(58) Field of Classification Search
CPC ... B62D 7/1509; B62D 5/0463; B62D 5/0493
USPC ....................................... 180/402, 443, 444
See application file for complete search history.

(56) References Cited

U.S. PATENT DOCUMENTS

| | | | |
|---|---|---|---|
| 2019/0118856 A1 | 4/2019 | Won | |
| 2020/0353975 A1* | 11/2020 | Nakamura | ............ H02P 29/028 |

FOREIGN PATENT DOCUMENTS

| | | | | |
|---|---|---|---|---|
| CN | 109964401 A | * | 7/2019 | .......... B62D 5/0481 |
| CN | 110857117 A | * | 3/2020 | .......... B62D 5/0481 |
| DE | 102015222266 A1 | * | 5/2017 | ............ H02K 11/33 |
| EP | 3 466 795 A1 | | 4/2019 | |
| KR | 10-2019-0045466 A | | 5/2019 | |
| KR | 10-2021-0092455 A | | 7/2021 | |

(Continued)

OTHER PUBLICATIONS

Extended European search report issued on Nov. 22, 2023, in counterpart European Patent Application No. 22211406.8 (11 pages).
(Continued)

*Primary Examiner* — Jacob D Knutson
(74) *Attorney, Agent, or Firm* — NSIP Law

(57) ABSTRACT
Disclosed is motor driven power steering system of a redundancy structure. The system includes a driving motor that drives a steering wheel, first and second power circuits that supply control power, first and second driving circuits that drive the driving motor, first and second position sensors that detect a rotational position of the driving motor, and first and second processors operatively coupled to the driving motor. The first processor and second processors are operatively coupled to respective redundant elements of the power circuits, the position sensors, and the driving circuits. Each of first processor and the second processor independently receives steering control signals from the upper-level control device to allow the driving circuits to be operated based on the respective position sensors, thereby allowing the driving motor to be operated.

20 Claims, 2 Drawing Sheets

(56)               References Cited

FOREIGN PATENT DOCUMENTS

| | | | |
|---|---|---|---|
| WO | WO-2015040961 A1 * | 3/2015 | ............. B62D 5/049 |
| WO | WO-2021015460 A1 * | 1/2021 | ........... B62D 15/021 |

OTHER PUBLICATIONS

Korean Office Action issued on Apr. 23, 2024, in counterpart Korean Patent Application No. 10-2022-0103311 (5 pages in English, 5 pages in Korean).

* cited by examiner

FIG. 1

MOTOR DRIVEN POWER STEERING SYSTEM OF REDUNDANCY STRUCTURE

This application claims the benefit under 35 USC § 119(a) of Korean Patent Application 10-2022-0103311, filed on Aug. 18, 2022, in the Korean Intellectual Property Office, the entire disclosure of which is incorporated herein by reference for all purposes.

BACKGROUND

1. Field

The present disclosure relates to a motor driven power steering system of a redundancy structure in which a driving motor for redundant driving of the motor driven power steering system is independently controlled through a redundant circuit.

2. Description of Related Art

A motor driven power steering system (MDPS) may provide auxiliary torque in a direction in which a driver of a vehicle steers a wheel by using an electric motor, thereby making the driver's wheel handling lighter.

In contrast to a conventional hydraulic power steering (HPS) system, the motor driven power steering system may have improved steering performance and steering feel by automatically controlling an operation of the electric motor based on a driving condition of the vehicle. Here, the motor driven power steering system may determine the driving condition of the vehicle by including a torque sensor that measures the driver's steering torque input to the steering wheel, a steering angle sensor that measures a steering angle of the steering wheel, and a vehicle speed sensor that measures a vehicle speed. As such, the motor driven power steering system greatly affects steering safety of the vehicle, and reliable and safe operation of the vehicle may rely on corresponding operation of the motor driven power steering system.

A driving motor used in the motor driven power steering system may include a direct current (DC) motor or an alternating current (AC) motor. The driving motor in some instances is a conventional three-phase brushless AC motor, which can include a double winding motor to which double winding is applied. The double winding motor may include two or more power supplies, and may be a motor designed to drive the motor only by inputting power to the remaining power supply even if a motor element or motor winding connected to any one of the two or more power supplies fails or breaks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a motor driven power steering system of a redundancy structure. The system includes a driving motor that drives a steering wheel, first and second power circuits that supply control power, first and second driving circuits that drive the driving motor, first and second position sensors that detect a rotational position of the driving motor, and first and second processors operatively coupled to the driving motor. The first processor is operatively coupled to the first power circuit, the first position sensor, and the first driving circuit. The second processor is operatively coupled to the second power circuit, the second position sensor, and the second driving circuit. The first processor receives a first steering control signal from an upper-level control device to allow the first driving circuit to be operated based on the first position sensor, thereby allowing the driving motor to be operated. The second processor receives a second steering control signal from the upper-level control device to allow the second driving circuit to be operated based on the second position sensor, thereby allowing the driving motor to be operated.

The first position sensor and the second position sensor may respectively be mounted on positions corresponding to those of the lower surface and upper surface of one circuit board.

The first position sensor, the circuit board, and the second position sensor may be sequentially arranged in one magnetic flux direction of a position detection magnet positioned in the driving motor.

The first position sensor may transmit each of a first position signal and a first comparison signal to the first processor, and the second position sensor may transmit each of a second position signal and a second comparison signal to the second processor.

The first processor may stop its operation when a tolerance between the first position signal and the first comparison signal exceeds a predetermined first reference error as a result of comparison of the two signals, and the second processor may stop its operation when a tolerance between the first position signal and the first comparison signal two signals exceeds a predetermined second reference error as a result of comparison of the two signals.

The driving motor may be a double winding motor including a first winding motor and a second winding motor.

The first winding motor may be operatively coupled to the first power circuit, the first position sensor, the first driving circuit, and the first processor, and the second winding motor may be operatively coupled to the second power circuit, the second position sensor, the second driving circuit, and the second processor.

One processor of the first and second processors may take a main control and allow the driving motor to be operated while the first and second processors monitor their mutual operation states, and the main control may be switched to the other processor of the first and second processors when the error occurs, and the other processor may allow the driving motor to be operated.

The first and second driving circuits may each include at least one phase switch converting direct current (DC) driving power to a three-phase power supply, and at least one cut-off switch completely cutting off the three-phase power supply when a failure occurs therein.

In an embodiment, a motor driven power steering system of a redundancy structure includes: a driving motor driving a steering wheel; first and second driving circuits driving the driving motor; first and second position sensors detecting a rotational position of the driving motor; a first processor; and a second processor, wherein the first processor receives a first steering control signal from an upper-level control device to allow the first driving circuit to be operated based on the first position sensor, thereby allowing the driving motor to be operated, and the second processor receives a second steering control signal from the upper-level control device to allow operate the second driving circuit be operated based on the second position sensor, thereby allowing the driving motor to be operated.

The first position sensor and the second position sensor may respectively be mounted on positions corresponding to those of the lower surface and upper surface of one circuit board.

The first position sensor, the circuit board, and the second position sensor may be sequentially arranged in one magnetic flux direction of a position detection magnet positioned in the driving motor.

The first position sensor may transmit each of a first position signal and a first comparison signal to the first processor, the second position sensor may transmit each of a second position signal and a second comparison signal to the second processor. The first processor may stop its operation when a tolerance between the first position signal and the first comparison signal exceeds a predetermined first reference error as a result of comparison of the two signals, and the second processor may stop its operation when a tolerance between the first position signal and the first comparison signal exceeds a predetermined second reference error as a result of comparison of the two signals.

The driving motor may be a double winding motor including a first winding motor and a second winding motor, the first winding motor may be operatively coupled to the first position sensor, the first driving circuit, and the first processor, and the second winding motor may be operatively coupled to the second position sensor, the second driving circuit, and the second processor.

One of the first and second processors may take a main control and allow the driving motor to be operated while the first and second processors monitor their mutual operation states, and the main control is switched to the other of the first and second processors when the error occurs, and the other of the first and second processors may allow the driving motor to be operated.

BRIEF DESCRIPTION OF THE DRAWINGS

FIG. 1 is a block diagram showing a motor driven power steering system of a redundancy structure according to an embodiment of the present disclosure.

DETAILED DESCRIPTION

Figure 2:
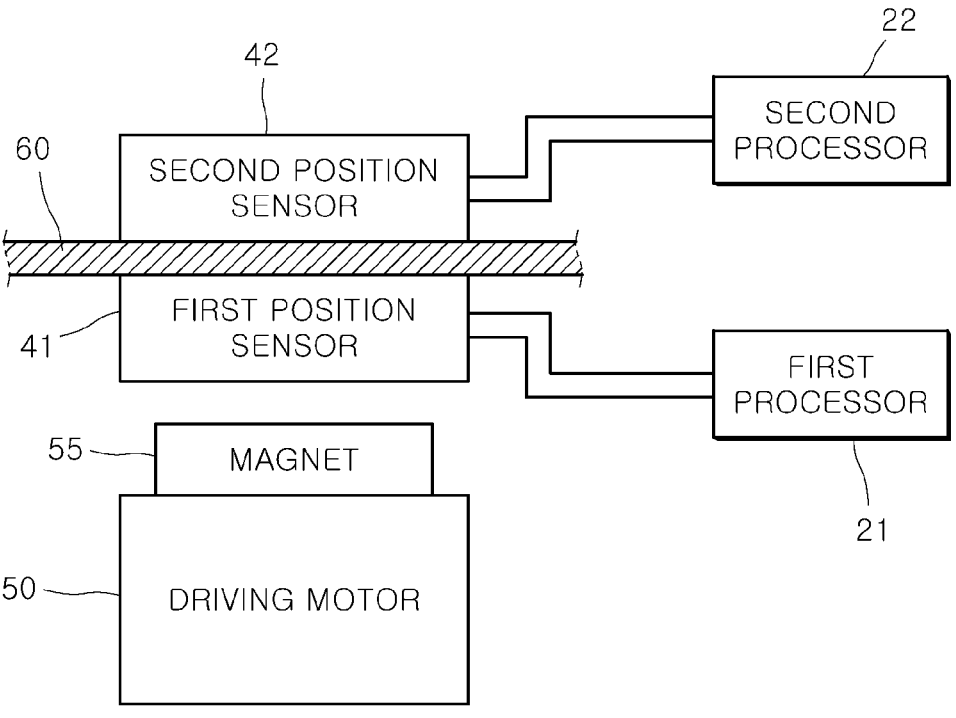
FIG. 2 is an exemplary diagram briefly showing arrangement of a position sensor in the motor driven power steering system of a redundancy structure according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
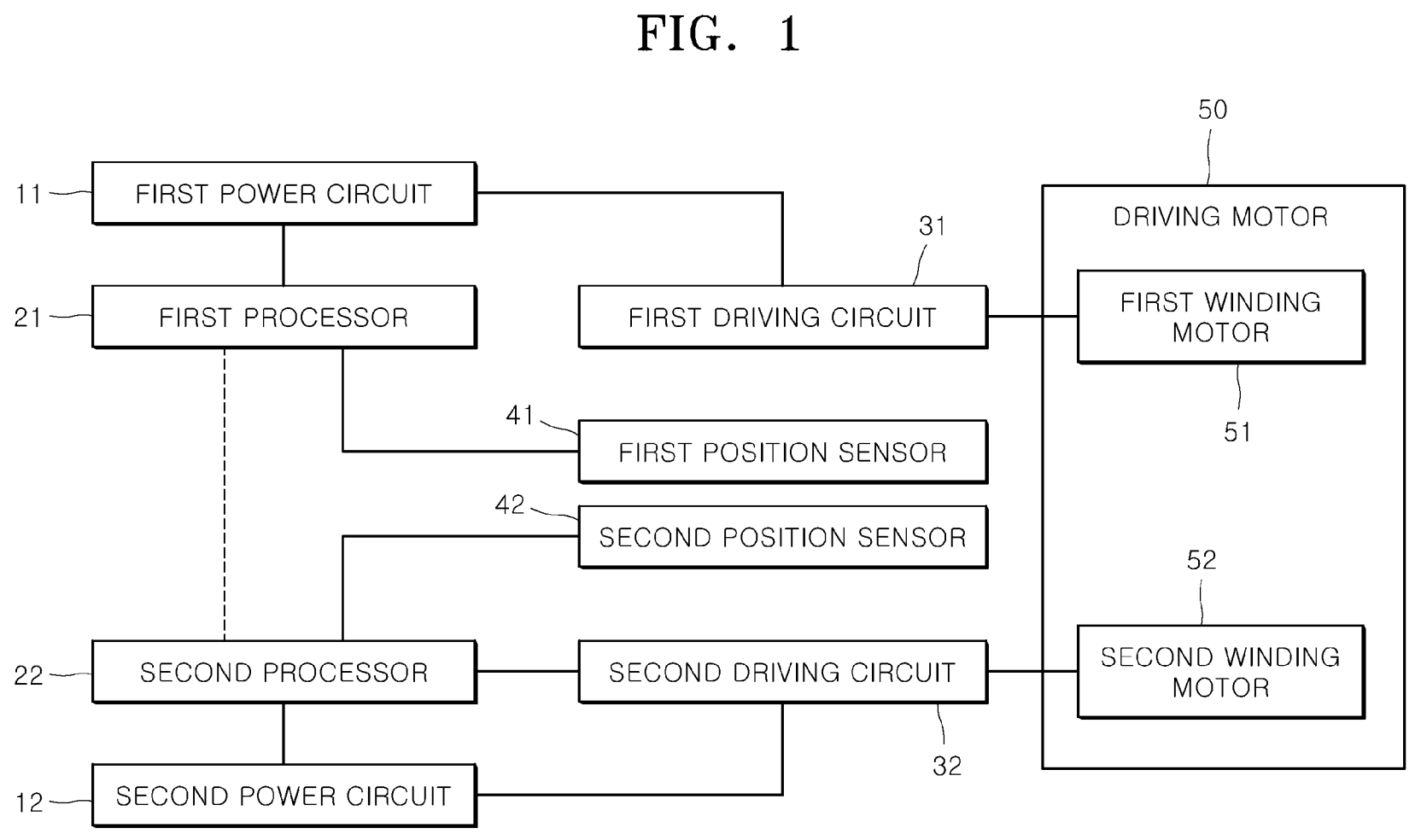

FIG. 1 is a block diagram showing a motor driven power steering system of a redundancy structure according to an embodiment of the present disclosure; and FIG. 2 is an exemplary diagram briefly showing arrangement of a position sensor in the motor driven power steering system of a redundancy structure according to an embodiment of the present disclosure.

As shown in FIG. 1, the motor driven power steering system of a redundancy structure according to an embodiment of the present disclosure may include a driving motor 50, first and second power circuits 11 and 12, and first and second driving circuits 31 and 32, first and second position sensors 41 and 42, and first and second processors 21 and 22.

The driving motor 50 may be a driving actuator of the motor driven power steering system, and substantially rotate and steer a steering wheel (not shown).

Here, the driving motor 50 may be a double winding motor that outputs one power but includes a first winding motor 51 and a second winding motor 52 therein, and have a redundancy structure in which the driving motor 50 is driven through control means independent from each other.

Accordingly, the first winding motor 51 may be operatively coupled to the first power circuit 11, the first position sensor 41, the first driving circuit 31, and the first processor 21; and the second winding motor 52 may be operatively coupled to the second power circuit 12, the second position sensor 42, the second driving circuit 32, and the second processor 22.

The first and second power circuits 11 and 12 may respectively supply control power and driving power to the first and second processors 21 and 22 and the first and second driving circuits 31 and 32, independently from each other.

The first and second driving circuits 31 and 32 may respectively vary a frequency of the three-phase power supply based on control signals of the first and second processors 21 and 22 to adjust the speed and torque of the first winding motor 51 and the second winding motor 52 of the driving motor 50, thereby independently driving the driving motor 50.

Here, the first and second driving circuits 31 and 32 may each include at least one phase switch, including an inverter, which converts direct current (DC) driving power to the three-phase power supply, and at least one cut-off switch completely which cuts off the three-phase power supply when a failure occurs therein.

In this case, the phase switch and the cut-off switch may be a power semiconductor device such as a metal-oxide-semiconductor field-effect transistor (MOSFET)/insulated gate bipolar transistor (IGBT).

The first and second position sensors 41 and 42 may each detect a rotational position of the driving motor 50 to output a position signal and a comparison signal, thereby comparing and verifying whether a measured value is normal.

Here, the first and second position sensors 41 and 42 may be respectively mounted on positions corresponding to those of the lower surface and upper surface of one circuit board 60 as shown in FIG. 2.

Here, the first position sensor 41, the circuit board 60, and the second position sensor 42 may be sequentially arranged in a magnetic flux direction (i.e., z-axis direction) of a position detection magnet 55 positioned in the driving motor 50, and the first position sensor 41 and the second position sensor 42 may thus be robust against an external magnetic field.

Accordingly, the first position sensor 41 may transmit, to the first processor 21, each of a first position signal for detecting position of the magnet 55 and a first comparison signal for monitoring and comparing whether the first position signal is normal; and the second position sensor 42 may transmit, to the second processor 22, each of a second position signal for detecting the position of the magnet 55 and a second comparison signal for monitoring and comparing whether the second position signal is normal.

The first and second processors 21 and 22 may be operatively coupled to the driving motor 50, the first and second power circuits 11 and 12, the first and second position sensors 41 and 42, and the first and second driving circuits 31 and 32, respectively.

Accordingly, the first processor 21 may receive a (for example, first) steering control signal from an upper-level control device to allow the first driving circuit 31 to be operated based on the first position sensor 41, thereby allowing the first winding motor 51 of the driving motor 50 to be operated.

In addition, the second processor 22 may receive a (for example, second, different, separately sent, independently sent, etc.) steering control signal from the upper control device independently from the first processor 21 to allow the second driving circuit 32 to be operated based on the second position sensor 42, thereby allowing the second winding motor 52 of the driving motor 50 to be operated.

Here, the first processor 21 may stop its operation when a tolerance between the first position signal and the first comparison signal is out of (for example, exceeds) a predetermined first reference error as a result of the comparison of the two signals; and the second processor 22 may stop its operation when a tolerance between the first position signal and the first comparison signal is out of (for example, exceeds) a predetermined second reference error as a result of the comparison of the two signals. Accordingly, any one processor may allow the driving motor 50 to be operated to enable the steering unless the error occurs in both the first position sensor 41 and the second position sensor 42. The first reference error and the second reference error may be the same or different from each other based on a system environment.

Meanwhile, one processor may take a main control and allow the driving motor 50 to be operated while the first and second processors 21 and 22 monitor their mutual operation states, and the main control may be switched to the other processor when the error occurs, and the other processor may be driven to allow the driving motor 50 to be operated.

As described above, according to the motor driven power steering system of a redundancy structure according to an embodiment of the present disclosure, the position sensor, driving circuit, processor, and power supply of the driving motor for redundant driving of the motor driven power steering system may each have the redundancy structure to be driven independently from each other, and the driving motor may thus be allowed to be operated by the other independent processor even when one processor fails, thereby securing stability of the processor and robustness of the position sensor against the external magnetic field.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The present disclosure has been made in an effort to solve problems in the related art, and the present disclosure is directed to a motor driven power steering system of a redundancy structure, in which the position sensor, driving circuit, processor, and power supply of the driving motor for the redundant driving of the motor driven power steering system each have the redundancy structure to be driven independently from each other, and the driving motor is allowed to be operated by the other independent processor even when one processor fails, thereby securing the stability of the processor and the robustness of the position sensor against the external magnetic field.

The present disclosure has also been made to implement a redundancy structure of a double winding motor, thereby improving the safe and reliable driving of the motor. Embodiments of the present disclosure may be implemented in a motor driven power steering system that drives various actuators centered on an electronic control device, and provides an independent redundancy structure suitable to meet the increasing demands for safety and reliability in an autonomous driving era.

The present disclosure has also been made to facilitate implementation of a redundancy structure in which the position sensor, driving circuit, processor, and power supply of a driving motor for redundant driving of the motor driven power steering system each have the redundancy structure to be driven independently from each other (for example, the processors may be connected to respective redundant elements). The embodiments may thereby improve the safe and reliable driving of the motor through the redundancy structure by applying such a double winding structure, for example, to the driving motor used in the motor driven power steering system.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A motor driven power steering system of a redundancy structure, the system comprising:
a driving motor configured to drive a steering wheel;
first and second power circuits configured to supply control power;
first and second driving circuits configured to drive the driving motor;
first and second position sensors configured to detect a rotational position of the driving motor; and
first and second processors operatively coupled to the driving motor,
wherein the first processor is operatively coupled to the first power circuit, the first position sensor, and the first driving circuit, and

the second processor is operatively coupled to the second power circuit, the second position sensor, and the second driving circuit,
wherein the first processor is configured to receive a first steering control signal from an upper-level control device to allow the first driving circuit to be operated based on the first position sensor, thereby allowing the driving motor to be operated, and
the second processor is configured to receive a second steering control signal from the upper-level control device to allow the second driving circuit to be operated based on the second position sensor, thereby allowing the driving motor to be operated, and
wherein the first position sensor is configured to transmit each of a first position signal and a first comparison signal to the first processor.

2. The system of claim 1, wherein the first position sensor and the second position sensor are respectively mounted on positions corresponding to those of a lower surface and an upper surface of one circuit board.

3. The system of claim 2, wherein the first position sensor, the circuit board, and the second position sensor are sequentially arranged in one magnetic flux direction of a position detection magnet positioned in the driving motor.

4. The system of claim 1, wherein
the second position sensor is configured to transmit each of a second position signal and a second comparison signal to the second processor.

5. The system of claim 4, wherein the first processor is configured to stop operation when a tolerance between the first position signal and the first comparison signal exceeds a predetermined first reference error as a result of comparison of the two signals, and
the second processor is configured to stop operation when a tolerance between the first position signal and the first comparison signal exceeds a predetermined second reference error as a result of comparison of the two signals.

6. The system of claim 1, wherein the driving motor is a double winding motor including a first winding motor and a second winding motor.

7. The system of claim 6, wherein the first winding motor is operatively coupled to the first power circuit, the first position sensor, the first driving circuit, and the first processor, and
the second winding motor is operatively coupled to the second power circuit, the second position sensor, the second driving circuit, and the second processor.

8. The system of claim 1, wherein one of the first and second processors is configured to take a main control and allow the driving motor to be operated while the first and second processors monitor their mutual operation states, and the main control is switched to the other of the first and second processors when the error occurs, and the other of the first and second processors is configured to allow the driving motor to be operated.

9. The system of claim 1, wherein the first and second driving circuits each include at least one phase switch configured to convert direct current (DC) driving power to a three-phase power supply, and at least one cut-off switch configured to completely cut off the three-phase power supply when a failure occurs therein.

10. The system of claim 1, wherein the first and second power circuits are further configured to supply driving power independently from each other.

11. The system of claim 1, wherein the first and second driving circuits are configured to drive the driving motor by respectively varying a frequency of a three-phase power supply based on control signals of the first and second processors to adjust speed and torque of the driving motor independently.

12. The system of claim 1, wherein the first and second position sensors are further configured to be robust against an external magnetic field.

13. The system of claim 1, wherein the first processor is configured to receive a first steering control signal from the upper-level control device independently from the second processor; and the second processor is configured to receive a second steering control signal from the upper-level control device independently from the first processor.

14. A motor driven power steering system of a redundancy structure, the system comprising:

a driving motor configured to drive a steering wheel;

first and second driving circuits configured to drive the driving motor;

first and second position sensors configured to detect a rotational position of the driving motor;

a first processor; and a second processor, wherein the first processor is configured to receive a first steering control signal from an upper-level control device to allow the first driving circuit to be operated based on the first position sensor, thereby allowing the driving motor to be operated, and the second processor is configured to receive a second steering control signal from the upper-level control device to allow operate the second driving circuit be operated based on the second position sensor, thereby allowing the driving motor to be operated, and wherein the first position sensor is configured to transmit each of a first position signal and a first comparison signal to the first processor.

15. The system of claim 14, wherein the first position sensor and the second position sensor are respectively mounted on positions corresponding to those of a lower surface and an upper surface of one circuit board.

16. The system of claim 15, wherein the first position sensor, the circuit board, and the second position sensor are sequentially arranged in one magnetic flux direction of a position detection magnet positioned in the driving motor.

17. The system of claim 14, wherein the second position sensor is configured to transmit each of a second position signal and a second comparison signal to the second processor, the first processor is configured to stop operation when a tolerance between the first position signal and the first comparison signal exceeds a predetermined first reference error as a result of comparison of the two signals, and the second processor is configured to stop operation when a tolerance between the first position signal and the first comparison signal exceeds a predetermined second reference error as a result of comparison of the two signals.

18. The system of claim 14, wherein the driving motor is a double winding motor including a first winding motor and a second winding motor, the first winding motor is operatively coupled to the first position sensor, the first driving circuit, and the first processor, and the second winding motor is operatively coupled to the second position sensor, the second driving circuit, and the second processor.

19. The system of claim 14, wherein one of the first and second processors is configured to take a main control and allow the driving motor to be operated while the first and second processors monitor their mutual operation states, and the main control is switched to the other of the first and second processors when the error occurs, and the other of the first and second processors is configured to allow the driving motor to be operated.

20. The system of claim 14, wherein the first processor is configured to receive a first steering control signal from the upper-level control device independently from the second processor; and the second processor is configured to receive a second steering control signal from the upper-level control device independently from the first processor.

* * * * *